(12) United States Patent
Colom

(10) Patent No.: US 11,287,029 B2
(45) Date of Patent: Mar. 29, 2022

(54) DAMPING MECHANISM FOR A SHIFT SELECTOR ASSEMBLY AND A SHIFT SELECTOR ASSEMBLY COMPRISING THE DAMPING MECHANISM

(71) Applicant: Fico Triad, S.A., Barcelona (ES)

(72) Inventor: Javier Moreno Colom, Barcelona (ES)

(73) Assignee: Fico Triad, S.A, Barcelona (ES)

( * ) Notice: Subject to any disclaimer, the term of this patent is extended or adjusted under 35 U.S.C. 154(b) by 101 days.

(21) Appl. No.: 16/111,617

(22) Filed: Aug. 24, 2018

(65) Prior Publication Data

US 2019/0063592 A1   Feb. 28, 2019

(30) Foreign Application Priority Data

Aug. 25, 2017   (EP) ..................... 17382584

(51) Int. Cl.
| | | |
|---|---|---|
| *F16H 59/00* | (2006.01) | |
| *F16H 59/02* | (2006.01) | |
| *F16H 59/10* | (2006.01) | |
| *F16H 61/24* | (2006.01) | |

(52) U.S. Cl.
CPC ..... *F16H 59/0208* (2013.01); *F16H 59/0278* (2013.01); *F16H 59/10* (2013.01); *F16H 61/24* (2013.01); *F16H 2061/241* (2013.01)

(58) Field of Classification Search
CPC .. F16H 59/0208; F16H 59/0278; F16H 59/10; F16H 61/24; F16H 2061/241
See application file for complete search history.

(56) References Cited

U.S. PATENT DOCUMENTS

| | | | | |
|---|---|---|---|---|
| 2,172,663 | A * | 9/1939 | Manning ................ | B60K 20/04 74/473.29 |
| 4,018,099 | A * | 4/1977 | O'Brien ................ | B60K 20/04 74/473.21 |
| 5,899,115 | A * | 5/1999 | Kataumi ............. | F16H 59/0204 74/473.12 |
| 7,246,538 | B2 * | 7/2007 | Hermansson .......... | G05G 9/047 24/33 P |

(Continued)

FOREIGN PATENT DOCUMENTS

| | | |
|---|---|---|
| JP | 2006182112 A | 7/2006 |
| WO | 2005037591 A1 | 4/2005 |
| WO | 2015185280 A1 | 12/2015 |

OTHER PUBLICATIONS

Extended European Search Report for Application No. 17382584.5, dated Nov. 20, 2017, 13 pages.

*Primary Examiner* — Zakaria Elahmadi
(74) *Attorney, Agent, or Firm* — Brooks Kushman P.C.

(57) ABSTRACT

The damping mechanism comprising a damping element suitable for absorbing impacts from a movable part of the shift selector assembly. The damping mechanism comprising a and a support member to which the damping element is rotatably mounted. A shift selector assembly is also provided. The assembly includes a fixed part, a moveable part, a damping element, and a support member. The movable part can be moved relative to the fixed part and biased onto a contoured surface. The damping element absorbs impacts from the moveable part of the shift selector. The support member is rotatably mounted to the damping element.

20 Claims, 2 Drawing Sheets

(56) References Cited

U.S. PATENT DOCUMENTS

| | | | |
|---|---|---|---|
| 2001/0017063 A1* | 8/2001 | Wildeshaus | F16H 63/38 74/473.29 |
| 2007/0068323 A1* | 3/2007 | Dieter | F16H 59/0204 74/523 |
| 2010/0257970 A1* | 10/2010 | Giefer | F16H 61/22 74/473.21 |
| 2016/0327156 A1* | 11/2016 | Kumar | F16H 59/0208 |
| 2017/0037962 A1* | 2/2017 | Moreno Colom | F16H 61/24 |
| 2017/0097089 A1* | 4/2017 | Teknos | F16H 59/0208 |
| 2017/0159808 A1* | 6/2017 | Kuhne | F16H 59/0208 |
| 2018/0363772 A1* | 12/2018 | Ahn | F16H 59/10 |
| 2018/0372212 A1* | 12/2018 | Peschke | F16H 59/0217 |

\* cited by examiner

DAMPING MECHANISM FOR A SHIFT SELECTOR ASSEMBLY AND A SHIFT SELECTOR ASSEMBLY COMPRISING THE DAMPING MECHANISM

CROSS-REFERENCE TO RELATED APPLICATIONS

This application claims priority to European patent application No. EP 17382584.5 filed on Aug. 25, 2017, the disclosure of which is incorporated in its entirety by reference herein.

TECHNICAL FIELD

The present disclosure relates to shift-by-wire gearshift devices for controlling motor vehicle transmissions and more particularly to damping mechanisms for absorbing impacts from a shift lever during use.

BACKGROUND

Motor vehicle transmissions, in particular motor vehicle automatic transmissions, comprise a shift-by-wire gearshift device, also referred for example, to as ATX SbW shifter, including a shift lever operable for selecting gearshift positions corresponding to different transmission gears. A movable spring biased plunger is fitted in the shift lever to slide on a contoured surface as the shift lever is moved for selecting a gearshift position to give the user a gearshift feel.

In use, the shift lever is moved onto the contoured surface with the spring plunger pressed against a force generated by a spring element into the different gearshift positions defined in such contoured surface. During actuation of the shift lever, for example in monostable gearshift devices, annoying noise is usually generated when the shift lever is operated and returns to a stable position once a gearshift position has been selected. Noise may be also produced as the plunger impacts against the contoured surface when the shift lever returns to a stable position. The noise produced can be transmitted into the interior of the vehicle and can be noticed by the driver and the passengers resulting in discomfort as the vehicle is running.

Attempts have been made in conventional systems to at least reducing noise that consists of providing a sound-insulating element in the contoured surface. Document WO2015185280, for example, describes a shift mechanism for an automatic transmission in a motor vehicle including a contoured surface onto which a shift lever can be operated for selecting gearshift positions corresponding to different transmission gears. The contoured surface is made of materials having different degrees of elasticity.

The main disadvantage in the prior art solutions is that the shift lever has to overcome too much friction from the sound-insulating element in the contoured surface. This is because one portion of the shift lever, i.e. the plunger, is always in contact with the sound-insulating element as it is operated in different gearshift positions.

There is therefore a need for shift selector mechanisms for motor vehicle transmissions capable of at least reducing the above disadvantages while still being effective in use.

SUMMARY

A damping mechanism is provided for a shift selector assembly in a motor vehicle transmission as well as a shift selector assembly comprising the damping mechanism, with which the above disadvantages are overcome. Both the damping mechanism and the shift selector assembly also provide a number of important advantages as will be described below.

The damping mechanism described herein comprises a damping element that is suitable for absorbing impacts from a movable part of the shift selector assembly.

The damping mechanism further comprises a support member to which the damping element is rotatably mounted. The damping mechanism may be, for example, a damping disc fitted in the support member such that it can be rotated in the support member by the action of the movable part of the shift selector assembly during use. Still in a further example, the support member may be resiliently mounted to a fixed part such that the support member can be moved relative to the fixed part by the impacts from the movable part of the shift selector assembly during use.

As used herein, resiliently refers to the ability of a given part for returning back to an original position from a different position. This may involve a resilient member to be initially compressed or bent so as to bias the part to the original position.

The support member may be part of the fixed part with the damping element being allowed to move relative to the fixed part by the impacts from the movable part of the shift selector assembly during use. It may be preferred that the damping element is mounted to the support member such that the damping element can be resiliently moved relative to the fixed part by the impacts from the movable part of the shift selector assembly during use. In any case, at least one of the damping element or the support member may be arranged such that it can be resiliently moved relative to the fixed part by the impacts from the movable part during actuation of the shift selector assembly.

The support member may comprise first guides and/or second guides. The first guides in the support member may allow the damping element to be moved relative to the fixed part during use. The second guides of the support member may allow the resilient member to be suitable fitted therein and moved if required during operation.

The damping element may have a geometry consisting in one selected from a cylinder, a ring, or a sphere, or a portion of one of them. In any case, it is preferred a damping element having a lateral damping surface suitable for absorbing impacts from the movable part of the shift selector assembly during use.

For the above mentioned resilient action on the support member or on the damping element, a resilient member may be fitted. The resilient member may be arranged between the support member and the fixed part and/or the resilient member may be fitted in the support member to act on the damping element. The resilient member may be one or more of a compression spring, a viscoelastic element, a rubber element, a spring wire, etc.

In a further example of the present damping mechanism, at least one portion of the damping element may be suitable to be deformed, e.g. elastically, when absorbing impacts from the movable part. As a result, a damping element is provided adapted to be rotated but not to be resiliently displaced relative to the fixed part. In this case, the displacement occurs via the resilient deformation of at least one portion of the damping element.

A shift selector assembly for motor vehicle transmissions is also provided. It comprises a fixed part, a movable part that can be moved relative to the fixed part and biased onto a contoured surface, and the damping mechanism described above for absorbing impacts from the movable part during use. The contoured surface of the shift selector assembly may be attached to or be integral with a shifter housing.

It may be preferred that the damping element is positioned in a location corresponding to a stable position of the movable part. This is applicable for example in monostable gearshift devices where the movable part, that is, the shift lever, can be moved along a shift pattern for in different directions from an initial or stable position into a final or unstable position for selecting a gearshift position. After the desired gearshift position has been selected, the shift lever automatically returns by itself into the initial or stable position. In this respect, it may be preferred that the damping element is positioned in a location corresponding to the intersection between all the possible paths of the movable part relative to the fixed part; for example, the intersection between all the possible paths of the shift lever along the shift pattern.

A preferred positioning of the damping element may be for example a lateral position in a shifter housing according to a stable position of the movable part.

The present damping mechanism has been shown to provide a very smooth operation of a shift selector assembly with a very comfortable operation on the part of the driver. It has been also shown that, with the present damping mechanism, noise due to impacts of the shift lever during operation is advantageously dampened, preventing such impacts from being transmitted to the user. As a result, the user experience is improved due to a dampened feeling.

A further important advantage of the present damping mechanism is that, since the shift lever is only temporarily in contact with the damping element during operation of the shift lever in different gearshift positions, the shift lever is not required to overcome too much friction as it is operated. Since the damping element is arranged to rotate around its axis, the movable part, that is, the shift lever, is advantageously not subjected to high friction by the damping element as it is operated. The movable part, that is, the shift lever, therefore does not have to overcome undesirable frictions when operated by the user. This in turn results in that the hardness of the damper element may be selected based simply on friction damping properties as desired. This allows costs to be reduced while extending the useful life of the damping mechanism as wearing down the damping element is reduced.

The damping element may be a flexible part. One example of flexible part may be a pre-compressed member, for example, an elastomeric member made of. for example, rubber or similar material suitable for reducing or absorbing shock impulses, vibrations and impacts from the movable part, for example from the shift lever as it returns to the stable position after being operated for selecting a gearshift position. Also, the damper element is suitable for at least partially reducing the noise due to the collision of the movable part against the slopes of contoured surface.

Additional objects, advantages and features of several examples of the present damping mechanism will become apparent to those skilled in the art upon examination of the description, or may be learned by practice thereof.

BRIEF DESCRIPTION OF THE DRAWINGS

Particular embodiments of the present damping mechanism will be described in the following. The present description is given by way of non-limiting examples and with reference to the appended drawings.

In the drawings.

DETAILED DESCRIPTION

Figure 1:
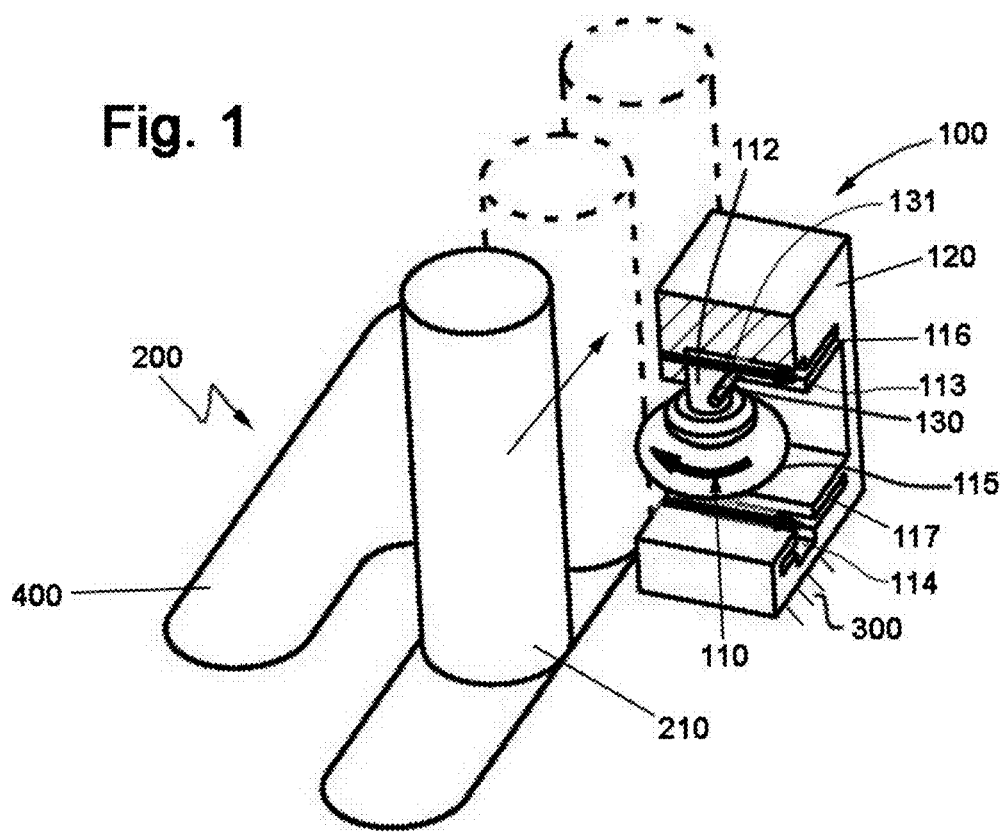
FIG. 1 is a diagrammatic perspective view of a first example of the present damping mechanism where a wire spring is used acting of the damping element.

A non-limiting example of the present damping mechanism is described below with reference to the figures. In the examples, like reference numerals refer to like parts throughout the several views of the drawings.

The damping mechanism 100 is shown in the figures fitted in a shift selector assembly 200 of a motor vehicle transmission. The shift selector assembly 200 comprises a fixed part 300 and a movable part, that in this example corresponds to a shift lever 210. The shift lever 210 can be moved relative to the fixed part 300. In the present example, the fixed part 300 is part of a shifter housing of the shift selector assembly 200 although it could be a part attached thereto.

Figure 3:
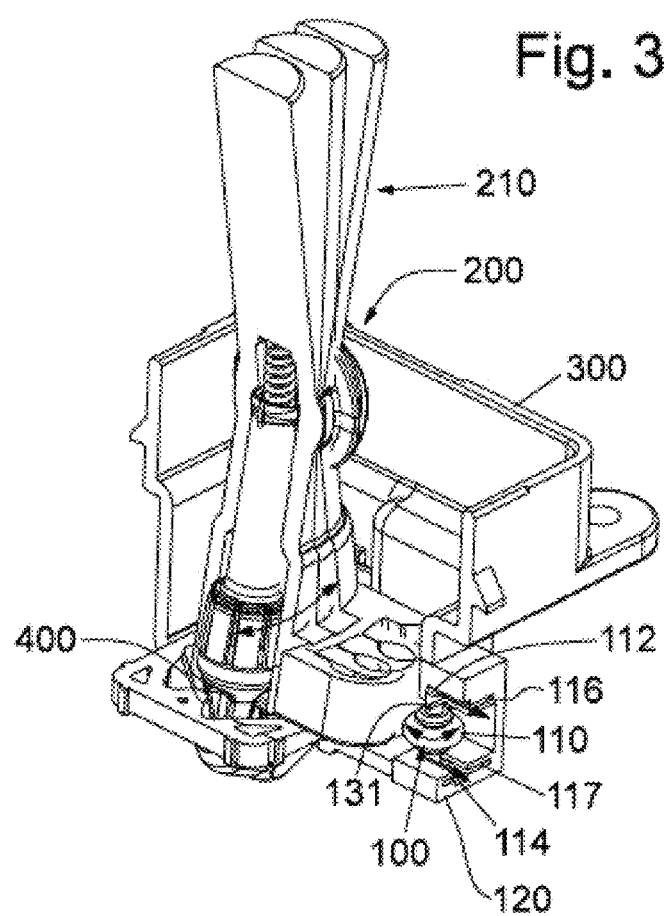
FIGS. 3 and 4 are perspective views showing the example of present damping mechanism shown in FIG. 1 with the shift lever being actuated in different operating directions.
Figure 4:
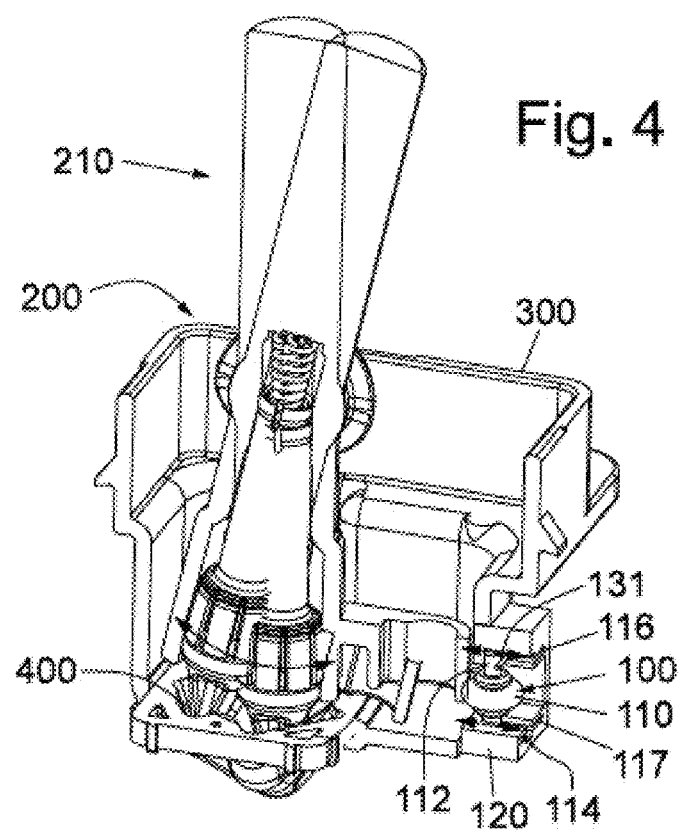

As shown in FIGS. 3 and 4 of the drawings, the shift lever 210 can be moved relative to the fixed part 300 in different directions biased onto a contoured surface 400. The contoured surface 400 is a bottom surface in a shifter housing where the shift lever 210 is movably mounted.

In the example shown in the figures of the drawings, the shift selector assembly 200 further includes a damping mechanism 100. The damping mechanism 100 is intended for absorbing impacts from the shift lever 210 as it is operated. FIG. 1 shows by dotted lines different positions of the shift lever 210 during use for driving a vehicle transmission.

The damping mechanism 100 comprises a damping element 110 configured in the form of a rotating damping disc 110. The damping disc 110 is made of a material such as rubber or similar material suitable for reducing or absorbing impacts, shocks, vibrations, etc. from the shift lever 210, for example when returning into a stable position in the shift selector assembly 200 after being operated for selecting a gearshift position. The damping disc 110 may however have other different shapes such as for example a cylinder, a ring, a sphere, or a portion of one of them having a lateral damping surface 115 suitable for absorbing impacts from the shift lever 210 as it is operated for driving a vehicle transmission.

The damping mechanism 100 further comprises a support housing 120 configured with an interior suitable for receiving the damping disc 110. The damping disc 110 can be rotated around an axis of rotation 112. Also, the damping disc 110 can be moved along the interior of the support housing 120.

For this purpose, the support housing 120 comprises first guides, grooves or channels 113, 114 formed along opposite, parallel upper and lower walls of the support housing 120. The axis of rotation 112, and thus the damping disc 110, is allowed to run along the first guides, grooves or channels 113, 114 in the support housing 120. The first guides, grooves or channels 113, 114 thus allow for the movement of the damping disc 110 relative to the fixed part 300 as it is impacted by the shift lever 210 during operation.

In the present example, the damping disc 110 is positioned in the shift selector assembly 200 in a location corresponding to a stable position of the shift lever 210, specifically in a location corresponding to the intersection of all the possible paths of the shift lever 210 in the shift selector assembly 200. In the example shown, the damping mechanism 100 is located in a lateral position in the shifter housing. When the damping element 110 is in a rest position, it is partly arranged in the corresponding location of the shift lever 210. In use, the damping element 110 undergoes two basic movements as the shift lever 210 is operated during normal use: a frontal return movement in which most of the impact is absorbed by the resilient member 130, and a tangential return movement in which a tangential impact is most absorbed by the resilient member 130 combined with rotation of the damping element 110 while allowing the movement of the shift lever 210. This tends to prevent or at least reduce friction on the shift lever 210 as it is driven in an opposite direction when leaving a stable position.

A resilient member 130 is provided to act against the movement of the damping disc 110 relative to the fixed part 300.

According to a first example shown in FIG. 1, the resilient member comprises a wire spring 131. The wire spring 131 is inserted inside second guides, grooves or channels 116, 117 that are also formed in the support housing 120 to act on the damping disc 110. In this particular case, the support housing 120 could be part of the fixed part 300.

In further examples, the wire spring 131 may be a U-shaped wire spring intended to allow the axis of rotation 112 of damping element 110 to resiliently move in use. In further examples, however, the resilient member 130 may comprise a single wire arranged at one end of the axis of rotation 112 of the damping element 110. Still in further examples, the resilient member 130 may comprise two separate wires arranged at corresponding opposite ends of the axis of rotation 112 of the damping element 110. In any case, the wire spring 131 is suitable for causing the axis of rotation 112 of the damping element 110 to be displaced when in use.

Figure 2:
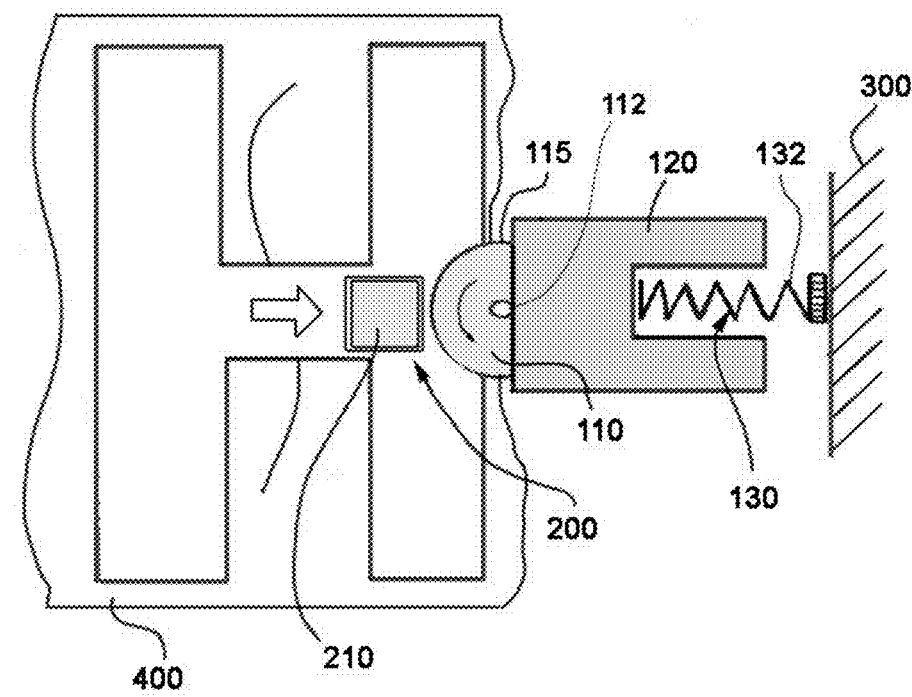
FIG. 2 is a sectional view of a second example of the present damping mechanism where a compression spring is used acting of the damping element.

A second example of the resilient member 130 is shown in FIG. 2. In this case, the resilient member 130 comprises a compression spring 132 that is fitted between the support housing 120 and the fixed part 300. In this way, the support housing 120 is allowed to resiliently move relative to the fixed part 300 by the impacts from the shift lever 210 against the damping disc 110.

Although particular examples of the present damping mechanism and shift selector assembly have been disclosed herein, it will be understood by those skilled in the art that other alternative examples and/or uses and obvious modifications and equivalents thereof are possible. For example, although examples of resilient members have been shown comprising a wire spring or a compression spring, other types of resilient members may be used such as for example a viscoelastic or rubber element, etc. and even a combination of different resilient members. In other examples, the damping element could be configured to be rotated but not to be resiliently displaced relative to the fixed part. For this purpose, the damping element may include at least one portion that is suitable to be deformed when absorbing impacts from the movable part such that displacement occurs via the resilient deformation the portion or portions of the damping element.

The scope of the present disclosure should not be thus limited by particular examples but should be determined only by a fair reading of the claims that follow.

Reference signs related to drawings and placed in parentheses in a claim, are solely for attempting to increase the intelligibility of the claim and shall not be construed as limiting the scope of the claim.

What is claimed is:

1. A damping mechanism for a shift selector assembly in a motor vehicle transmission, the damping mechanism comprising:
    a damping element to absorb impacts from a movable part of the shift selector assembly, and
    a support member to which the damping element is rotatably mounted,
    wherein the damping element temporarily contacts a shift lever when the shift lever moves into different gearshift positions, and
    wherein the damping element rotates about an axis of rotation that extends through the damping element and the damping element is capable of rotating past the shift lever to disengage from the shift lever, and
    wherein the damping element rotates and slides along a perpendicular axis relative to the shift lever when the damping element temporarily contacts the shift lever.

2. The damping mechanism of claim 1, wherein at least one of the damping element or the support member is arranged to be resiliently moved relative to a fixed part by the impacts from the movable part.

3. The damping mechanism of claim 2, wherein the support member is resiliently mounted to the fixed part such that the support member can be moved relative to the fixed part by the impacts from the movable part.

4. The damping mechanism of claim 2, wherein a resilient member is fitted between the support member and the fixed part.

5. The damping mechanism of claim 2, wherein the support member is part of the fixed part and the damping element can be moved relative to the fixed part by the impacts from the movable part.

6. The damping mechanism of claim 2, wherein the damping element can be resiliently moved relative to the fixed part by the impacts from the movable part.

7. The damping mechanism of claim 2, wherein a resilient member is fitted in the support member to act on the damping element.

8. The damping mechanism of claim 7, wherein the support member comprises first guides for the movement of the damping element relative to the fixed part.

9. The damping mechanism of claim 8, wherein the support member comprises second guides for the movement of a resilient member.

10. The damping mechanism of claim 9, wherein the resilient member is a compression spring.

11. The damping mechanism of claim 9, wherein the resilient member is a viscoelastic or rubber element.

12. The damping mechanism of claim 1, wherein the damping element has a geometry consisting one selected from a cylinder, a ring, or a sphere, or a portion of one of cylinder, the ring, or the sphere having a lateral damping surface suitable for absorbing impacts from the movable part.

13. A shift selector assembly for motor vehicle transmissions, comprising:
    a fixed part, and
    a movable part that can be moved relative to the fixed part and biased onto a contoured surface, and the damping mechanism of claim 1 for absorbing impacts from the movable part.

14. A damping mechanism for a shift selector assembly in a motor vehicle transmission, the damping mechanism comprising:

a damping element to absorb impacts from a movable part of the shift selector assembly, and a support member rotatably mounted to the damping element, wherein the damping element temporarily contacts a shift lever during operation of the shift lever when the shift lever moves into different gearshift positions, wherein the damping element rotates about an axis of rotation that extends through the damping element and the damping element is capable of rotating past the shift lever to disengage from the shift lever, and wherein the damping element rotates and slides along a perpendicular axis relative to the shift lever when the damping element temporarily contacts the shift lever.

15. The damping mechanism of claim 14, wherein at least one of the damping element or the support member is arranged to be resiliently moved relative to a fixed part by the impacts from the movable part.

16. The damping mechanism of claim 15, wherein the support member is resiliently mounted to the fixed part such that the support member can be moved relative to the fixed part by the impacts from the movable part.

17. A shift selector assembly for motor vehicle transmissions, comprising:

a fixed part, a movable part that can be moved relative to the fixed part and biased onto a contoured surface, a damping element to absorb impacts from the moveable part of the shift selector; and a support member rotatably mounted to the damping element, wherein the damping element temporarily contacts a shift lever during operation of the shift lever when the shift lever moves into different gearshift positions, wherein the damping element rotates about an axis of rotation that extends through the damping element and the damping element is capable of rotating past the shift lever to disengage from the shift lever, and wherein the damping element rotates and slides along a perpendicular axis relative to the shift lever when the damping element temporarily contacts the shift lever.

18. The damping mechanism of claim 1, wherein the damping element includes a shaft to enable the damping element to rotate about the support member.

19. The damping mechanism of claim 18, wherein the shaft forms the axis of rotation for the damping element to rotate thereabout.

20. The damping mechanism of claim 18, wherein the shaft extends completely through the damping element.

* * * * *